March 3, 1970     A. C. SANFORD     3,498,170
CONNECTOR PLATE COMBINATION

Filed Oct. 20, 1966     3 Sheets-Sheet 1

INVENTOR.
ARTHUR CAROL SANFORD
BY Hamilton & Cook
ATTORNEYS

March 3, 1970   A. C. SANFORD   3,498,170
CONNECTOR PLATE COMBINATION
Filed Oct. 20, 1966   3 Sheets-Sheet 2

INVENTOR.
ARTHUR CAROL SANFORD
BY Hamilton & Cook
ATTORNEYS

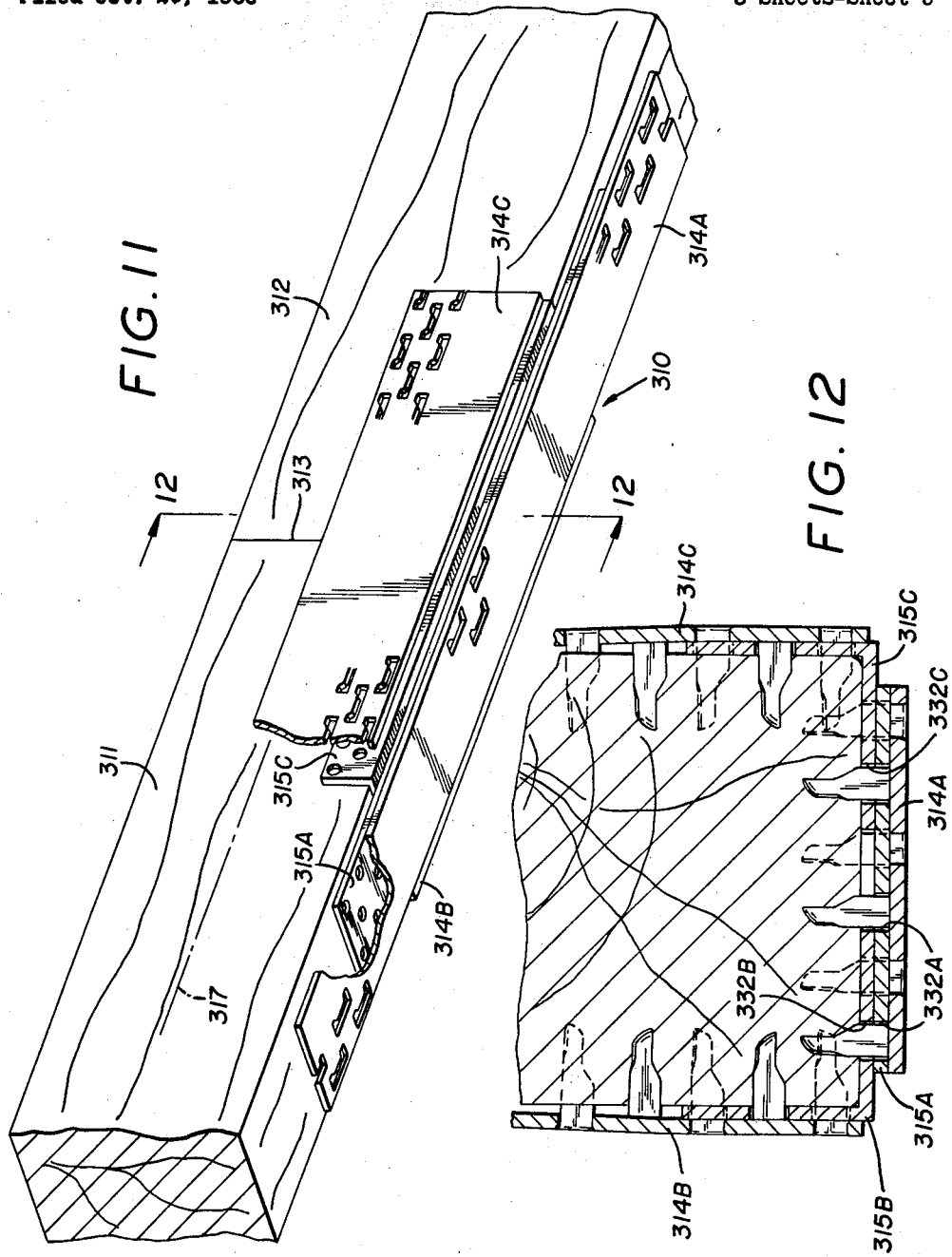

United States Patent Office 3,498,170
Patented Mar. 3, 1970

3,498,170
CONNECTOR PLATE COMBINATION
Arthur Carol Sanford, 400 S. Ocean Blvd.,
Palm Beach, Fla. 33480
Filed Oct. 20, 1966, Ser. No. 588,167
The portion of the term of the patent subsequent
to Dec. 17, 1985, has been disclaimed
Int. Cl. F16b 15/00
U.S. Cl. 85—13          12 Claims

ABSTRACT OF THE DISCLOSURE

A connector plate combination for wooden members having two elements: a toothed plate and grommet plate of lesser area having a plurality of apertures, the central portion of said toothed plate overlying and abutting said grommet plate, some of the teeth being received through said apertures to prevent lateral movement of said grommet plate relative to said toothed plate when all of the teeth are embedded in a wood member abutting said grommet plate.

BACKGROUND OF THE INVENTION

Toothed connector plates are particularly adapted for connecting wooden structural members at their joints. Until recently, the ultimate strength that a connector plate could impart to a joint was measured by the holding power of the teeth, because, when wooden members joined by connector plates were loaded to failure, the plates would buckle and the teeth would extract well before the plate would fail in other respects.

With the advent of more sophisticated tooth design, holding power increased to such an extent that the connector plates begin to fail under cross sectional tensile stress or diagonal shear stress before either the teeth pulled out of the wood or before the aggregate shear strength of the teeth was exceeded.

Some attempts have been made to increase the tensile and shear strength of the plate by fabricating it out of metal of heavier gauge, but that merely compounds the inefficiency. With increased plate thickness the tooth size is correspondingly increased, causing more of the wood fibers to be displaced or severed upon entry of the teeth, thereby tending to decrease the holding power of the teeth; with increased plate thickness the aggregate shear strength of the teeth is further increased, thus increasing the already inefficient disparity between the aggregate shear strength and the holding power of the teeth; and, with increased plate thickness the inefficiency would be compounded by the expense of adding useless metal to the teeth.

It is therefore an object of the present invention to provide a toothed connector plate combination having increased tensile and diagonal shear strengths as well as increased aggregate tooth holding power.

It is another object of the present invention to provide a toothed connector plate combination in which the aggregate shear strength of the teeth, and the aggregate holding power of the teeth, the cross sectional tensile strength and/or the diagonal shear strength are substantially in balance.

SUMMARY OF THE INVENTION

These and other objects are accomplished by providing a perforate grommet plate of substantially the same gauge as the toothed connector plate and underlying the central portion thereof, said perforations registering with and interfitting the teeth in said central portion whereby when the teeth are embedded in an abutting wood member the grommet plate is held against lateral movement and the cross sectional tensile strength and diagonal shear strength of the connector plate are increased.

It is an even further object of the present invention to provide a connector plate combination which is economical to produce and capable of being applied to join wooden structural members as simply, efficiently, and with the same apparatus used to apply many previously known conntctor plates.

These and other objects which will become apparent from the following specification are accomplished by means hereinafter described and claimed.

Four variations of the preferred embodiment are shown by way of example in the accompanying drawings and hereinafter described in detail without attempting to show all of the various forms and modifications in which the invention might be embodied; the invention being measured by the appended claims and not by the details of the specification.

In the drawings:

FIG. 11 is a perspective, partly cut away, of a joint subjected primarily to bending moment as joined by the subject connector plate combination; and, FIG. 12 is an enlarged cross section taken substantially on line 12—12 of FIG. 11.

In the art an "exterior" type connector plate is used to connect structural members that are joined in abutting relation and a "sandwich" type connector plate is used to connect structural members that are joined in overlapping relation. While the concept of the present invention is applicable to either the exterior or the sandwich type connector plate, it will be described only in conjunction with the exterior type plate, the adaptation to the sandwich type being thereafter readily apparent.

In general, a connector plate combination constructed according to the concept of the present invention employs two elements: a connector plate having teeth of superb holding power; and, a grommet plate which meshingly interfits around at least a portion of the teeth on the connector plate to lie snugly between the body portion of the connector plate and the wooden members joined thereby.

In the preferred form disclosed the conector plate has a plurality of teeth which extend transversely outwardly of the plate from which they are struck or punched, in opposed pairs. Each tooth is preferably dished and has a generally rectangular base portion and a narrower tip portion.

The grommet plate is provided with a plurality of apertures through which the teeth of the connector plate extend. The teeth intermeshingly engage the aperture in abutting relation so as to maintain the grommet plate against lateral movement with respect to the body portion of the connector plate.

Figure 1:
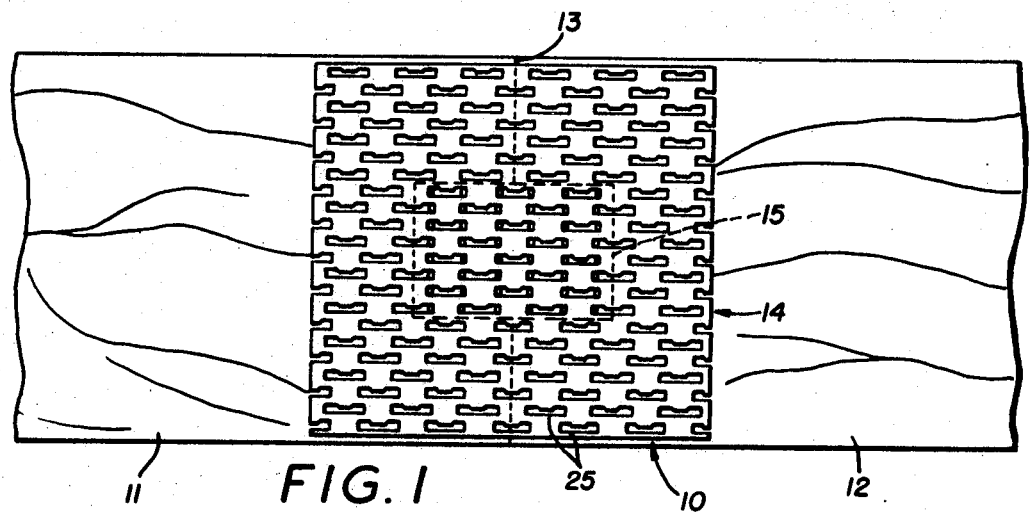
FIG. 1 is a plan view of two wooden members joined in abutting relation by a connector plate combination embodying the concept of the present invention.
Figure 2:
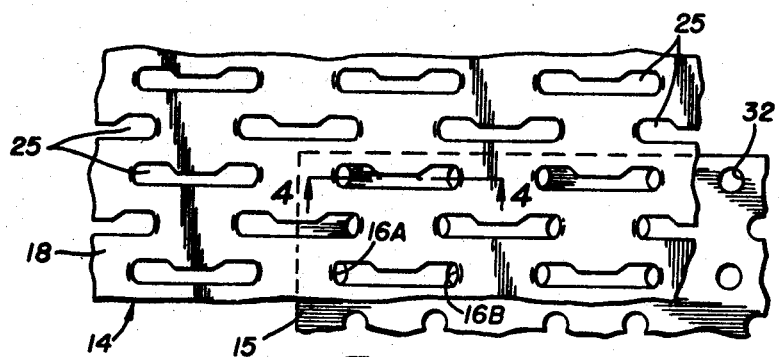
FIG. 2 is an enlarged partial area of FIG. 1.

Referring more particularly to the drawings, a connector plate combination according to the present invention is designtaed generally by the numeral 10 and is depicted, in FIG. 1, as connecting two abutting wooden members 11 and 12 together along a joinder line 13 in what may be termed a tensile joint. Generally such a connector plate combination will be applied to each side of the joint.

Each connector plate combination 10 comprises a connector plate 14 and a grommet plate 15.

Figure 4:
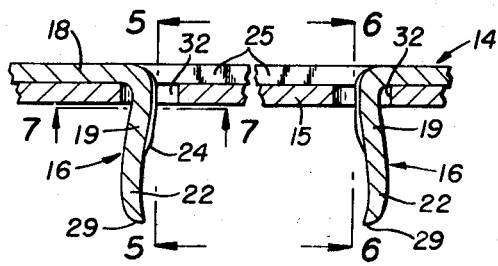
FIG. 4 is a further enlarged cross section taken subtially along line 4—4 of FIG. 2.
Figure 5:
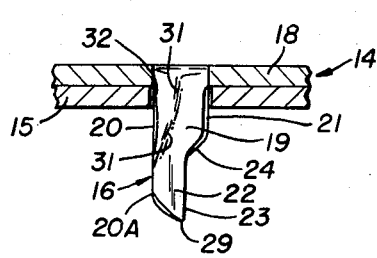
FIG. 5 is a cross section taken substantially on line 5—5 of FIG. 4 depicting a tooth in side elevation.
Figure 7:
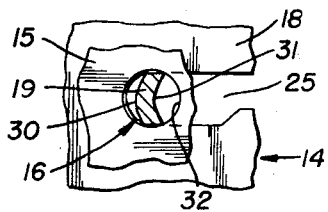
FIG. 7 is a cross section taken substantially on line 7—7 of FIG. 4.
Figure 6:
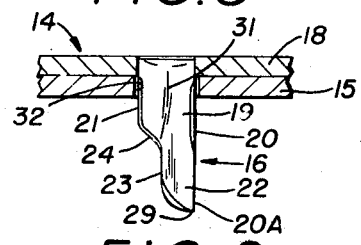
FIG. 6 is a cross section taken substantially on line 6—6 of FIG. 4 depicting a tooth opposed to that shown in FIG. 5 but punched from the same opening.

The connector plate 14 has a plurality of teeth 16 which are struck, or punched, from the body portion 18 of the plate preferably in opposed pairs. Referring to FIGS. 4, 5 and 6, each tooth 16 has a thickness generally equal to the thickness of the plate because it was struck therefrom, and each tooth has a base portion 19 the side edges 20 and 21 of which are generally parallel and extend generally perpendicularly outwardly from the body portion 18 of the plate 14. Each tooth 16 also has a tip portion 22, of lesser width than the base portion 19, which is formed integrally outwardly thereof with one edge 20A being preferably a continuation of the edge 20 on base portion 19. The opposite edge 23 of the tip portion is preferably parallel to edges 20 and 20A but is spaced more closely thereto than the corresponding edge 21 of the base portion 19. The edges 21 and 23 are joined by an inclined transitional shoulder 24.

The preferred proportions of this type tooth can best be seen in FIGS. 5 and 6. The width of the base portion 19 is approximately one-third the length of the tooth 16, with the length of the base portion being approximately one-half the length of the tooth, including the length of of the transitional shoulder 24 which is itself approximately one-sixth the length of the tooth. The width of the tip portion 22 is approximately one-half the width of the base portion 19.

Applying these preferred proportions to obtain the dimensions for a typical ⅜ of an inch long tooth, the base portion 19 would be approximately ⅛ of an inch wide and 3/16 of an inch long, of which the transitional shoulder would extend approximately 1/16 of an inch. The width of the tip portion 22 would also be approximately 1/16 of an inch.

These teeth 16 are punched in pairs from openings 25 which are longitudinally aligned and laterally staggered so that lateral alignment occurs between alternate rows. The die by which the teeth are punched causes the opposed teeth 16A and 16B in each pair to separate along a cleavage line 26 (FIG. 8) inclined with respect to the axis 28 of the longitudinal alignment of the openings so that the teeth present a point 29 at the outermost extent of the tip portion 22. And, as the teeth are punched the metal tends to draw along cleavage line 26 which defines the outermost extremity of each tooth, thus sharpening the tip of the tooth.

As the teeth are struck from the opening the punching die also bends each tooth so that there is a slight rearward arching of each tooth about its base portion 19 so that the tip portion 22 is inclined away from the opening 25 from which the tooth was struck in the direction of their longitudinal alignment.

Figure 3:
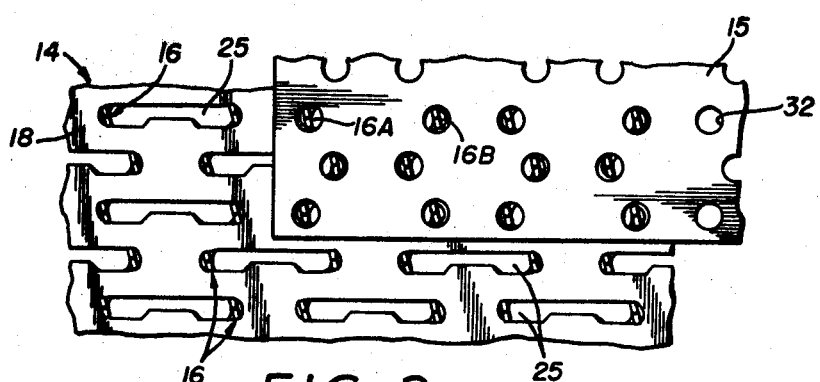
FIG. 3 is an obverse view of that portion of the connector plate combintaion represented in FIG. 2.

The punching die also crimps, or dishes, each tooth 16 so that the outer surface 30 of the base portion 19 is generally arcuate. The dishing is along a crimp line 31 which is slightly inclined with respect to the outwardly extending direction of the tooth so that the tooth is contorted into a gentle twist about the crimp line 31. It has been found desirable to incline the crimp line toward the side 20A of the tooth 16A on one side of opening 25 (FIG. 5) and toward the transitional shoulder 24 of the tooth 16B on the other side of opening 25 (FIG. 6) so that the teeth will be complementarily twisted, as can best be seen in FIG. 3.

The teeth having the particular configuration described aforesaid have been found to posses superb holding power and easy insertability and yet can be economically produced. However, the 16–22 gauge metal from which such connector plates are normally produced does not provide either the cross sectional tensile strength or diagonal shear strength to match the aggregate holding power or the aggregate shear strength of connector plates employing these teeth.

Nevertheless, the use of a grommet plate 15 across joinder line 13 in combination with the connector plate 11 has been found to produce nonpareil results, even though the size of the grommet plate is only a fraction of that of the connector plate, in increasing the tensile and diagonal shear strengths over those of the connector plate alone. It is, of course, necessary that the grommet plate have spanning ubiety with the joinder line 13.

The grommet plate 15 is a flat sheet of metal of approximately the same gauge as the connector plate and is provided with a plurality of apertures 32 disposed in a longitudinal and lateral pattern so that at least selective teeth 16 of the connector plate can be received therethrough to permit the grommet plate 15 to lie in juxtaposition with the body portion 18 of connector plate 14. It is necessary that the teeth closely intermesh with the apertures 32 for the grommet plate to do the most good. For example, with the particular teeth 16 disclosed, the base portion 19 extends across the diameter of the aperture 32 through which it extends. As such, the grommet plate 15 is maintained against both lateral and longitudinal movement with respect to the connector plate.

The exact shape of the apertures 32 is not critical so long as the position of the grommet plate 15 is maintained with respect to the connector plate 14. For example, the aperture could be constructed so that the abutment of the sidewalls of the aperture with the edges of the base portion 19 of each tooth maintains the grommet plate against lateral movement with respect to the connector plate. Further, the arcuate surfaces 30 of the base portion 19 on opposed teeth 16A and 16B could engage the opposed end wall of the apertures to maintain the grommet plate 15 against longitudinal movement with respect to the connector plate 14.

It has also been found that the holding power of the teeth which penetrate the apertures of the grommet plate is increased—the grommet plate reinforcing these teeth against bending and thereby increasing their holding power.

With the grommet plate 15 positioned in interengagement with the teeth 16 so as to span the joinder line of the wooden members, the teeth of the connector plate are driven, or pressed, into the wood. When the teeth are completely embedded, the grommet plate 15 is firmly fixed between the wooden members and the body portion 18 of the plate 14.

Most economical is the fact that the area of the grommet plate need only be a fraction of the area of the connector plate. Several examples of typical joints will permit a person skilled in the art readily to adapt this invention to his purpose.

The joint depicted in FIG. 1 represents the butt joint of two 2 x 6 joists joined to resist tensile stresses. By the use of a connector plate 14 measuring 5½ inches in width by 6 inches in length in combination with a grommet plate 15 measuring only 2 x 3 inches, both of 18 gauge steel and applied to both sides of the joint, the tensile strength of the joint is increased by approximately 62% over the exact same joint without the grommet plate.

Figure 9:
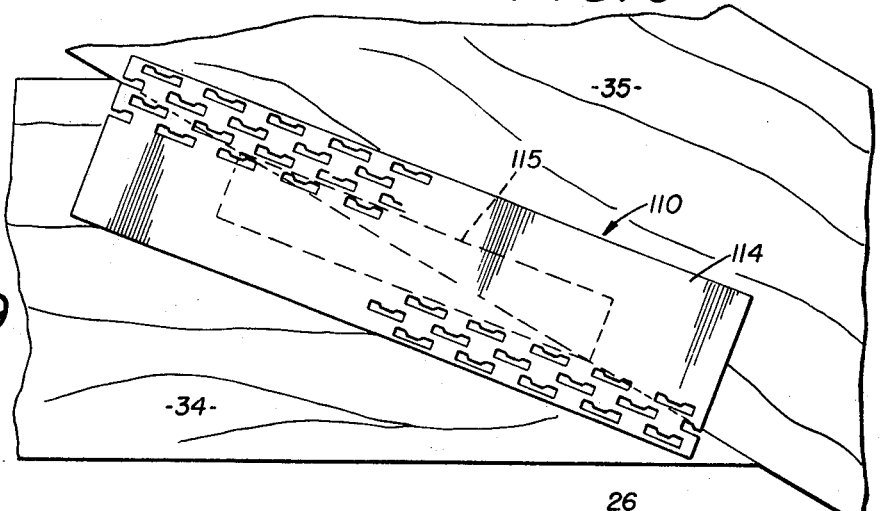
FIG. 9 is a view similar to FIG. 1 depicting the use of the subject concept to join the wooden structural members at the heel joint of a truss.

In FIG. 9 the bottom chord member 34 of a typical truss heel joint is connected to the upper chord member 35 by a connector plate combination 110 in which the connector plate 114 measures 2½ by 10 inches and the grommet plate 115 measures only 1 x 6 inches. Here too, the connector and grommet plates are of 18 gauge steel and the joint displays an approximately 52% increase in the diagonal shear strength over the exact same joint without the grommet plate.

Figures 8, 10:
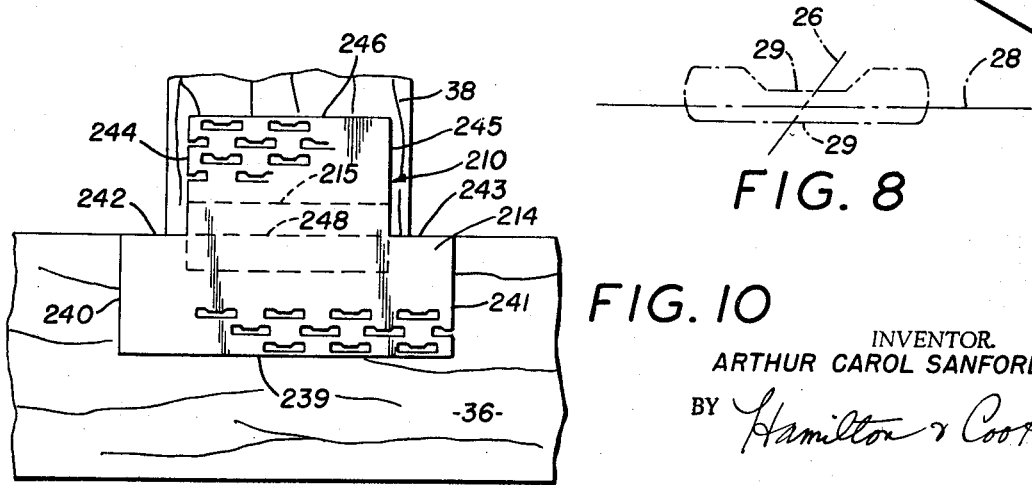
FIG. 8 is a plan view depicting the relationship of the parting line relationship of the two teeth to be punched from a single opening.
FIG. 10 is a view similar to FIGS. 1 and 9 depicting a representative bottom chord-to-king post joint.

In FIG. 10 another typical truss joint is represented—i.e., member 36 represents a lower chord member of a truss and member 38 represents the king post. The connector plate 214 in the connector plate configuration 210 is generally of inverted T-shaped configuration in which side 239 measures 5 inches, sides 240 and 241 measure 1¾ inches, sides 242 and 243 measure 1 inch, sides 244 and 245 measure 1¾ inches, and side 246 measures 3 inches. The grommet plate 215 is, as usual, positioned to span the joinder line 248 and of much smaller dimension. For this type joint the use of a grommet plate 215 measuring only 1 x 3 inches has been found to increase the strength of the joint almost 100%.

The present invention can even be used to great advantage in connecting wooden members subjected to a bending moment. For example, the two abutting members 311 and 312 depicted in FIG. 11 could represent a floor joist or the lower chord member of a truss which supports the ceiling. In either case the members 311 and 312 would be subjected to a bending moment such that that portion of the beam below the neutral axis 317 is subjected to a tensile stress and that portion of the beam above the neutral axis 317 is subjected to a compressive stress.

The abutment of the two members 311 and 312 across the joinder line 313 of itself is sufficient to accommodate the compressive stresses above the neutral axis so long as they do not exceed the strength of the members themselves. However, the members must be joined to transmit the tensile stress effectively, and a connector plate combination 310 embodying the concept of the present invention works extremely well.

Because the tensile stress is confined to a relatively small area beneath the neutral axis 317, it has been found desirable to compound the connector plate combination, exemplary of which is the system depicted by the sectional view in FIG. 12. The compounded combination there shown depicts the use of three connector plates 314. One connector plate 314A extends across joinder line 313 along the bottom, or tensile stressed side, of members 311 and 312, and plates 314B and 314C extend across joinder line 313 along the respective, opposed sidewalls of members 311 and 312. The grommet plate 315A is associated with connector plate 314A, as described in the previous examples. Grommet plates 315B and 315C, however, have an angle iron-like cross section and are therefore associated not only with connector plates 314B and 314C but also with connector plate 314A.

The typical compound connector combination 310 having components placed as depicted in FIGS. 11 and 12 and having the dimensions set forth below has been found to have an ultimate tensile strength of approximately nineteen thousand pounds when used to join two 2 x 4's subjected to a bending moment.

The grommet plates 315B and 315C are identical ¾ x ¾ angles eight inches long positioned to span joinder line 313 and lie in juxtaposition with the lower side and opposed side walls of the members 311 and 312. The connector plates 314B and 314C are two inches in vertical dimension and eight inches long.

The grommet plate 315A, which is 1½ inches wide and 12 inches long, is positioned across joinder line 313 on the underside of members 311 and 312. The apertures 332B and 332C, respectively, in the legs of grommet plates 315B and 315C which are positioned contiguously with the undersurface of members 311 and 312 register with corresponding apertures 332A through grommet plate 315A to receive the teeth 316A on connector plate 314A, itself preferably measuring 1½ inches in width and 16 inches in length. With all the connector plates 314 and grommet plates 315 of 18 gauge metal the component combination produced the ultimate strength set forth above.

Accordingly, it should be apparent that the use of a grommet plate in combination with a connector plate provides a most economical manner in which vastly to increase the strength of a joint between wooden structural members and thereby bring the cross sectional tensile strength and diagonal shear strength of the joinder plate into more even balance with the aggregate holding power of the teeth and aggregate shear strength of the teeth.

The objects of the invention have thus been accomplished.

What is claimed is:

1. A connector plate combination for connecting wooden members comprising, at least one connector plate and a cooperative grommet plate of substantially less area, said connector plate having a body portion and a plurality of teeth extending generally transversely outwardly from said body portion, the central portion of said body portion overlying said grommet plate, said grommet plate having a plurality of apertures, at least a portion of the number of teeth on said connector plate being insertably received through said apertures to position said grommet plate in substantial abutment with the body portion of said connector plate.

2. A connector plate combination, as set forth in claim 1, in which each tooth has a base portion by which the tooth is joined to the body portion of said connector plate and a tip portion, the apertures through which said teeth are received engaging the base portion of said teeth sufficiently to prevent movement of said grommet plate along the body portion of said connector plate.

3. A connector plate combination, as set forth in claim 1, in which each tooth has a base portion and a tip portion, said tip portion having a width substantially less than the width of said base portion, at least one edge of said base portion joining a corresponding edge on said tip portion and an inclined transitional shoulder, said base portion engaging the aperture through which it extends to prevent movement of said grammet plate along the body portion of said connector plate.

4. A connector plate combination, as set forth in claim 2, in which the apertures through said grommet plate and the teeth on said connector plate are oriented in a pattern whereby said grommet plate can be selectively positioned with respect to said connector plate.

5. A connector plate combination, as set forth in claim 4, in which the teeth on the connector plate are struck from the body portion in opposed pairs out of the same opening, the base portion of the teeth in each pair being dished such that said pair presents oppositely facing arcuate surfaces on the base portions thereof, and in which the apertures in said grommet plate are similarly arcuate abuttingly to engage the arcuate surfaces on said base portions to prevent movement of said grommet plate along the body portion of said connector plate.

6. A connector plate combination, as set forth in claim 5, in which there is a slight rearward arching of each tooth about its base portion such that the tip portion is inclined away from the opening from which the tooth was struck.

7. A connector plate combination, as set forth in claim 6, in which the openings from which the teeth are struck are longitudinally aligned in rows and laterally staggered with lateral alignment occurring between alternate rows.

8. A connector plate combination, as set forth in claim 7, in which the teeth struck from each opening separate along a cleavage line inclined slightly to the axis of the longitudinal alignment of said openings in order to present a point at the outermost extent of said tip portion.

9. A connector plate combination, as set forth in claim 8, in which the base and tip portions have parallel edges, one of the edges of said tip portion being a continuation of one edge of said base portion.

10. A connector plate combination, as set forth in claim 9, in which the length of the base portion is approximately one-half the length of the tooth and the width of the base portion is one-third the length of the tooth, with the width of the tip portion being approximately one-half the width of the base portion.

11. A connector plate combination, as set forth in claim 10, in which the teeth are contorted slightly about an axis defined by a crimp line which is inclined with respect to the outwardly extending direction of the tooth.

12. A connector plate combination, as set forth in claim 11, in which the crimp line is inclined toward the point of one tooth and toward the transitional shoulder of the opposed tooth punched from one opening.

References Cited

UNITED STATES PATENTS

| | | | |
|---|---|---|---|
| 3,068,738 | 12/1962 | Nulick | 85—13 |
| 3,212,389 | 10/1965 | Sandford | 85—13 |
| 3,292,481 | 12/1966 | Couch | 85—13 |
| 3,347,126 | 10/1967 | Templin et al. | 85—13 |
| 3,416,283 | 12/1968 | Sandford | 85—13 X |

RAMON S. BRITTS, Primary Examiner

Notice of Adverse Decision in Interference

In Interference No. 97,685 involving Patent No. 3,498,170, A. C. Sanford, CONNECTOR PLATE COMBINATION, final judgment adverse to the patentee was rendered Nov. 5, 1973, as to claims 1, 2 and 4.

[*Official Gazette August 13, 1974.*]